United States Patent Office 2,875,849
Patented Mar. 3, 1959

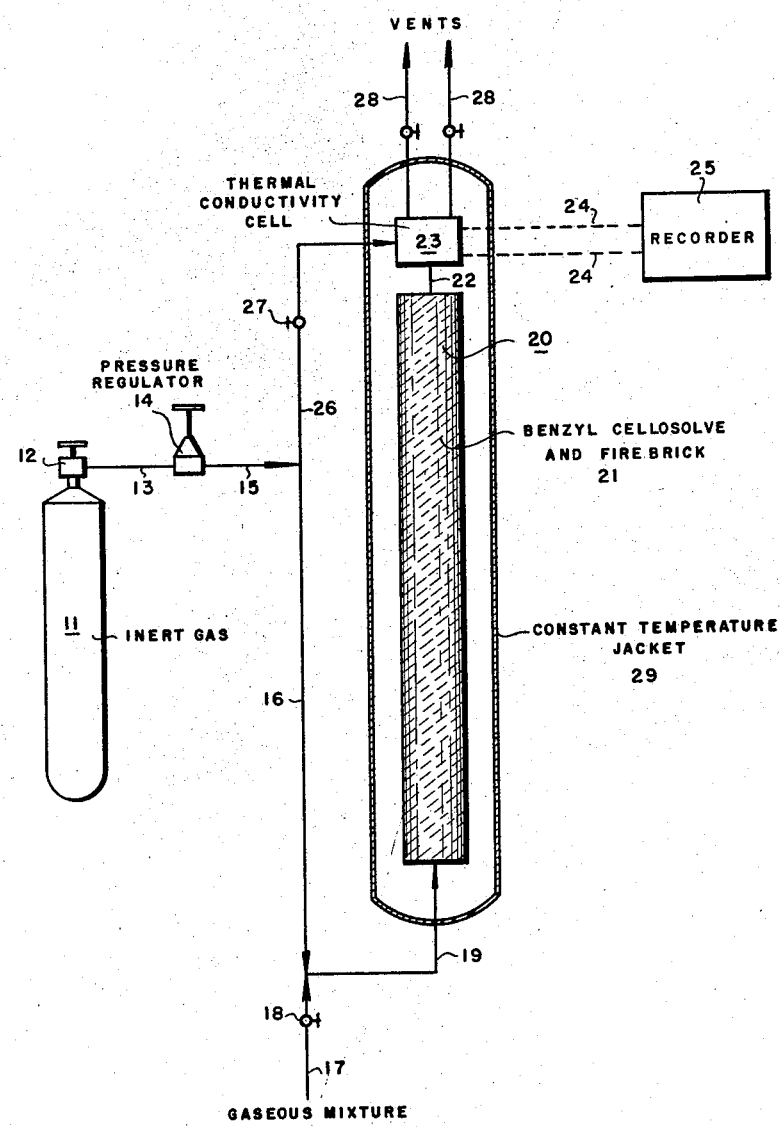

2,875,849

ANALYSIS OF GASEOUS MIXTURES

William R. Edwards, Daniel E. Nicholson, and Gilbert A. Reidland, Harris County, Tex., assignors, by mesne assignments, to Esso Research and Engineering Company, Elizabeth, N. J., a corporation of Delaware Application October 11, 1957, Serial No. 689,649

9 Claims. (Cl. 183—115)

The present invention is directed to the analysis of gaseous mixtures. More particularly, the invention is directed to an improved method of partition chromatography. In its more specific aspects, the invention is directed to gas-liquid partition chromatography employing a substrate.

The invention may be briefly described as a method for analyzing gaseous mixtures which comprises contacting a gaseous mixture in a stream of an inert gas in an elongated column packed with a support such as diatomaceous earth, acid treated firebrick, and the like, having a mesh size in the range from about 40 to about 60 at temperatures in the range from about 60° to about 120° F. and for a time within the range from about 5 to about 90 minutes, the support such as firebrick or diatomaceous earth being employed with a sufficient amount of benzyl cellosolve as a substrate. On contacting the gaseous mixture with the firebrick or diatomaceous earth support and substrate, the mixture is separated into its component parts.

The inert gas is preferably helium, but other inert gases may be employed, such as argon, nitrogen, or hydrogen.

Temperatures employed in the practice of the present invention may range from about 60° to about 120° F. with a preferred temperature range from about 75° to about 90° F.

The substrate employed in the present invention is benzyl Cellosolve, which is 2-(benzyloxy) ethanol and is employed in an amount in the range from about 20 to about 60 percent by weight of the firebrick or diatomaceous earth. The firebrick or other support containing about 40 percent by weight of benzyl cellosolve gives desirable results. While acid treated firebrick or acid treated diatomaceous earth such as Celite (which is unfired diatomaceous earth) are preferred supports, other supports such as pumice, silica gel, activated carbon, and similar finely divided inert materials may be used.

The present invention may be employed to separate gaseous hydrocarbon mixtures into their component parts, separating hydrogen sulfide from mixtures containing it, sulfur dioxide from mixtures thereof, carbon dioxide, and the like. Water, acetone, and $C_4$ hydrocarbons also may be resolved in accordance with the present invention.

The gaseous mixture undergoing analysis may contact the firebrick containing the Cellosolve or be retained thereon for a time within the range from about 5 to about 90 minutes. Exemplary of the type of compound and the retention time which are suitable in the practice of the present invention will be found in the following table:

| Compound: | Retention time, minutes |
|---|---|
| Air | 5.2 |
| Methane | 5.3 |
| Ethane | 6.1 |
| Ethylene | 6.3 |
| Hydrogen sulfide | 6.6 |
| Sulfur dioxide | 6.6 |
| Carbon dioxide | 6.7 |
| Propane | 8.1 |
| Propylene | 9.6 |
| Isobutane | 10.5 |
| Neo pentane | 13.0 |
| Normal butane | 13.8 |
| Iso butene | 17.4 |
| Butene-1 | 17.4 |
| Butadiene-1,3 | 19.6 |
| Trans-butene-2 | 20.4 |
| Iso pentane | 22.0 |
| Cis-butene-2 | 23.7 |
| 3-methylbutene-1 | 26.1 |
| Butadiene-1,2 | 26.3 |
| Methyl chloride | 27.3 |
| Normal pentane | 28.8 |
| Neo hexane | 35.2 |
| Pentene-1 | 37.8 |
| 2-methylbutene-1 | 40.1 |
| 2-methylbutene-2 | 44.0 |
| Trans-pentene-2 | 47.9 |
| 2,3 dimethylbutane | 48.1 |
| Iso hexane | 49.9 |
| Cis-pentene-2 | 51.8 |
| 4-methylpentene-1 | 60.7 |
| 3-methylpentene-1 | 61.0 |
| Hexene-1 | 84.5 |

The present invention will be further illustrated by reference to the drawing in which the sole figure is in the form of a flow sheet of a preferred mode.

Referring now to the drawing, a tank 11 containing an inert gas, such as helium, is provided which is controlled by a valve 12. A line 13 leads into a pressure regulator 14 which suitably reduces the pressure and discharges helium by way of line 15 into line 16. Admitted into line 16 is the gaseous mixture which may be a hydrocarbon mixture, by way of line 17 controlled by valve 18, the helium and gas mixture then flowing by line 19 into the chromatographic column 20, which is packed with benzyl Cellosolve and firebrick as indicated by the packing 21. The packing 21 resolves the gaseous mixture into its component parts which flow sequentially from the column 20 by way of line 22 into a thermal conductivity cell 23 which, by difference in thermal conductivity, indicates the presence and amounts of the various components. A signal is conducted from the cell 23 by electrical leads 24 into a recorder 25, which is of the type which draws a graph showing the proportions of the various components in the effluent flowing by line 22 into cell 23.

A portion of the helium in line 15 is suitably passed through line 26 controlled by valve 27 into cell 23 and flows outwardly therefrom by way of valve-controlled vents 28 along with the effluent gases from line 22.

The assembly, including the column 20 and the thermal conductivity cell 23, is suitably housed in a constant temperature jacket 29 which maintains temperature at the desired constant level.

In practicing the present invention, a column having a height in the range from about 5 to about 30 feet and a diameter in the range from about ⅛ to about ½ inch may be employed. A column which gives quite satisfactory results is ¼ inch in diameter and 20 feet long and may be packed suitably with 40 percent by weight benzyl Cellosolve on Johns-Manville C-22 Firebrick having a mesh from about 40 to about 60 and which has been treated with a suitable acid of a suitable strength. A temperature of about 86° F. may be used at a pressure of helium of about 5 pounds.

Although pressures of about 5 pounds may be suitable, pressures may range from about 1 to about 50 pounds per square inch gauge.

The present invention is particularly desirable and useful in that benzyl Cellosolve as a chromatographic substrate gives an unexpected improvement in that the results are obtained without delay, the column is operated at reasonable temperatures, which may be room temperature, and for mixtures such as water-acetone and $C_4$ hydrocarbons substantially improved resolution is obtained over other substrates such as tricresyl phosphate, Octoil, butyl Cellosolve, or phenyl Cellosolve. Octoil is di-2-ethyl-hexylsebacate.

Besides resolving mixtures containing the compounds mentioned before, the present invention has been used successfully in resolving a mixture of 1,3-butadiene, 1-butene, trans-butene-2, cis-butene-2, normal butane, and iso-butane.

The present invention is quite useful in analyzing complex gas mixtures, as has been indicated and shown, and may be used in control of commercial operations such as operations involving the extractive distillation of mixtures containing water, acetone and hydrocarbons, mixtures containing butylene and butadiene obtained from the dehydrogenation of butylene and in control of operations where butadiene is extracted with a solvent such as cuprous ammonium acetate.

The nature and objects of the present invention having been completely described and ilustrated, what we wish to claim as new and useful and secure by Letters Patent is:

1. A method for analyzing gaseous mixtures which comprises contacting a gaseous mixture in a stream of an inert gas with an elongated column of firebrick having a mesh size in the range from about 40 to about 60 at temperatures in the range from about 60° to about 120° F. and for a time within the range from about 5 to about 90 minutes, said firebrick being employed with benzyl Cellosolve as a substrate, whereby said mixture is separated into its components.

2. A method for analyzing gaseous mixtures which comprises contacting a gaseous mixture in a stream of helium with an elongated column of firebrick having a mesh size in the range from about 40 to about 60 at temperatures in the range from about 60° to about 120° F. and for a time within the range from about 5 to about 90 minutes, said firebrick containing 40% by weight of benzyl Cellosolve as a substrate, whereby said mixture is separated into its components.

3. A method for analyzing gaseous mixtures which comprises contacting a gaseous mixture in a stream of an inert gas with an elongated column of a support having a mesh size in the range from about 40 to about 60 at temperatures in the range from about 60° to about 120° F. and for a time within the range from about 5 to about 90 minutes, said support being employed with benzyl Cellosolve as a substrate, whereby said mixture is separated into its components.

4. A method in accordance with claim 3 in which the gaseous mixture contains a hydrocarbon.

5. A method in accordance with claim 3 in which the gaseous mixture contains hydrogen sulfide.

6. A method in accordance with claim 3 in which the gaseous mixture contains sulfur dioxide.

7. A method in accordance with claim 3 in which the gaseous mixture contains an oxygenated compound.

8. A method in accordance with claim 3 in which the gaseous mixture contains air.

9. A method for analyzing gaseous mixtures which comprises contacting a gaseous mixture in a stream of an inert gas with an elongated column of diatomaceous earth having a mesh size in the range from about 40 to about 60 at temperatures in the range from about 60° to about 120° F. and for a time within the range from about 5 to about 90 minutes, said diatomaceous earth being employed with benzyl Cellosolve as a substrate, whereby said mixture is separated into its components.

References Cited in the file of this patent

Vapour Phase Chromatography by D. H. Desty, Academic Press Inc., Publishers, New York, N. Y., 1956, pages 98 to 105.